Dec. 11, 1945. F. G. KELLEY 2,390,885
HANDCUFF
Filed Feb. 16, 1944
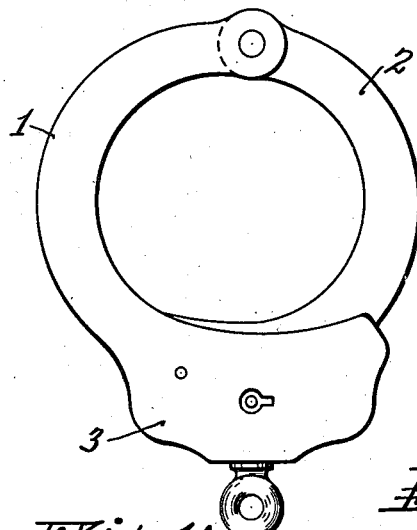
Fig. 1.
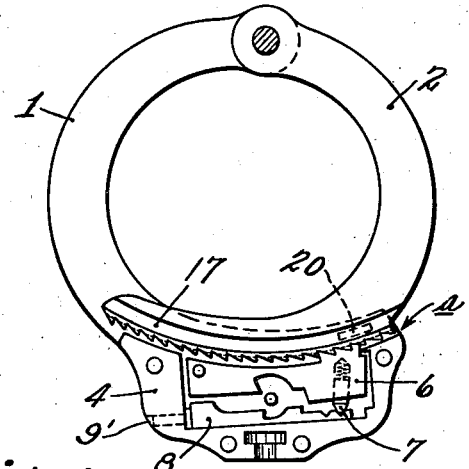
Fig. 2.
Fig. 1A.
Fig. 4.
Fig. 5.
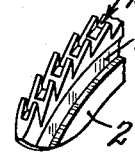
Fig. 8.
Fig. 7.
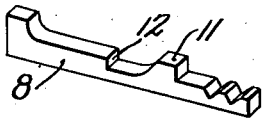
Fig. 6.
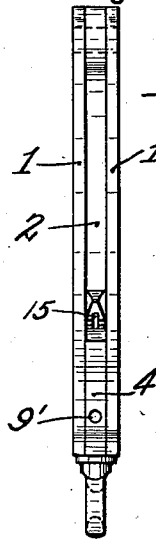
Fig. 3.
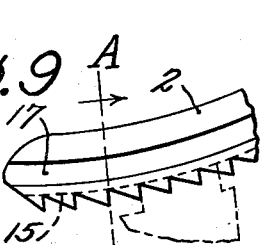
Fig. 9.
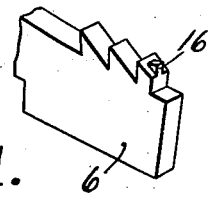
Fig. 11.
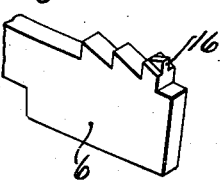
Fig. 10.
Fig. 9A.
INVENTOR
FRANCIS G. KELLEY
BY Chapin & Neal
ATTORNEYS Patented Dec. 11, 1945

2,390,885

UNITED STATES PATENT OFFICE 2,390,885

HANDCUFF

Francis G. Kelley, Springfield, Mass., assignor to Peerless Handcuff Company, Springfield, Mass., a corporation of Massachusetts Application February 16, 1944, Serial No. 522,585

8 Claims. (Cl. 70—16)

This invention relates to an improvement in handcuffs and particularly to means for avoiding the picking of handcuff locks.

The purpose of my invention is to improve the commercial form of handcuff, represented by that shown in the Wesson and Pomeroy Patent No. 1,872,857 of 1932. The idea of the improvement is to keep the advantages of simplicity, relatively small size, light weight, strength and low cost and add at very little extra cost the feature of a new structure to avoid the picking of the handcuff.

The way this is done will be disclosed by my drawing and description.

In the drawing:

Fig. 1 shows one of a pair of handcuffs adapted to be connected by links;

Fig. 1A shows a suitable type of key;

Fig. 2 shows the same handcuff with one arm and its integral lock casing plate removed and the lock mechanism in the casing;

Fig. 3 is an end view of Fig. 1;

Fig. 4 is a side view of the lock latch;

Fig. 5 is a perspective view of the bolt;

Fig. 6 is a side view of a portion of the swinging handcuff arm where the teeth on it begin;

Fig. 7 is an end view of Fig. 6;

Fig. 8 is a detail view showing one arrangement of teeth for the swinging arm;

Fig. 9 is a detail view indicating another arrangement of teeth, the latch being shown dotted;

Fig. 9A is a section on line A—A of Fig. 9;

Fig. 10 is a view showing one end construction of the latch; and

Fig. 11 is like Fig. 10 but with a slight modification.

The handcuff structure and operation, apart from the detail I have added, can be understood from Figs. 1 and 2. The main frame consists of two spaced arms 1, between which the swinging arm 2 is pivoted to turn in a full circle. The lock casing is made by using slightly enlarged portions 3 of arms 1 and a shallow trough-shaped spacer member 4. Portions 3 make the side plates and member 4 made the bottom and end walls of the lock casing. The arm 2 makes a movable top wall for the casing as will be seen. In Fig. 2, when the teeth of pivoted latch 6 engage the teeth of arm 2, the latter can swing in a full circle clockwise but not counterclockwise, provided only that pivoted latch 6 is only held up as it is, by a spring in detent plunger 7. Arm 2 will swing past the latch by a ratchet-like movement. But if sliding bolt 8 is moved, as it can be by a projection 9 on key 10 pushing it to the right from a small hole 9' through spacer member 4 of the lock casing, Figs. 2 and 3, then the shoulder 11 solidly underlies latch 6 and the latter can not move down. If at this time the teeth of arm 2 are in engagement with the teeth of the latch, the arm can not swing in either direction. The handcuff is completely locked. The bolt is moved to the left out of said locking position with the latch by turning the key in its key hole against shoulder 12 of bolt 8, see Fig. 5. The bolt slides on the bottom wall of the lock casing.

Of course when the bolt is in the left position, Fig. 2, arm 2 can turn clockwise until it is obstructed by a wrist. The arm is always in condition to function to lock a wrist under these conditions. While the purpose of the bolt is to double lock arm 2, the bolt operation requires attention to its function and a hand operation by the officer, which for one reason or another is not always carried out. Then a small lock picking tool, as a watch spring or the like can be used by the handcuffed man, in an attempt to pick the lock. If he can work such an instrument between the latch teeth and the teeth of arm 2, he can hold the latch teeth down, while he slides the swinging arm teeth back along the top of the tool and get free of the handcuff. The attempt will be helped if he can first wedge the tool between the two teeth engaged as an outside pair, close the handcuff a little to carry the tool in to get good engagement between other teeth and then pull the arm out with the latch riding on the under side of the tool. The dangerous opening for such tool is at a indicated in Fig. 2.

Various efforts will be seen in the prior art to guard the handcuff against such a lock picking operation. The present invention is to accomplish this purpose in a better way than any heretofore proposed. The reason it is better will be seen from the nature of the new structure added to the handcuff and from the way it operates.

The structure specifically described up to this point and its principles of operation is pretty well disclosed in prior patents. My purpose is to keep all the advantages of such structure and in addition provide my new structure to cooperate with it.

One way to do this is to mill or otherwise provide a slot 15 centrally across each tooth of arm 2, Fig. 9 and 9A. This will divide each tooth into two teeth with a transverse space between. While I refer to the slot 15, it will be seen that there are many aligned slots, one dividing each tooth into two teeth. All may be made in one milling operation at very little extra cost. To cooperate with slot 15, I provide a thin bar 16. It is carried by the outside or right hand tooth of the latch, see Fig. 10. It is rigidly and permanently fastened to the latch and is not movable in relation to the latch. While this bar 16 might be made integral with the latch, and is shown that way for convenience, I prefer the following way to supply it. I mill a slot extending down vertically in the middle of the end latch tooth. The bar 16 is made for a tight driving fit with this slot. In this way both the groove 15 and the bar 16 are supplied at extremely small cost and without any change in the way of making the main parts of the handcuff up to the point of making two milling cuts in the arm and latch, and supplying the little bar 16 to insert in one of the cuts.

The operation of the finished structure with my improvement added, is as before described except in the following respect. As the arm swings across the top of the lock casing, the bar 16 rides in the slot 15 dividing its teeth and when the handcuff is latched on the wrist, the bar 16 is in position to bar entrance of a lock picking tool at the point a. True, if the tool is thin enough and narrow enough it can at least in theory follow one or another line of the spaced rows of teeth and reach the latch. But on such a theory the tool will need to be about one-third the width of what the space offered for admittance before my improvement, and even more important the least deviation from a straight line insertion will cause its end to contact bar 16. The odds against the lock being picked are greatly increased, at almost no increased cost, and without the slightest interference with the desirable form and operation of the handcuff as now widely used.

It will be noted that side slots 17 on arm 2 above its teeth engage lugs 20, shown dotted, on adjacent side plates of the lock casing, see Fig. 2. When the arm is in locking position this arrangement strengthens the handcuff against being pulled apart at the lock casing by springing or distorting the arms between such casing and the pivot point of the arms. If the milling cut to divide the locking arm teeth in any instance weakens the connection of the teeth to the arm, the following provision may be made. The milling cut made to divide the teeth may be made of enough less depth so that a series of short teeth are left at the bottom of the milled groove, see Fig. 8. This offers the desirable advantages of stronger teeth, engagement of the latch teeth all the way crosswise of the locking arm teeth, and easy manufacture of three rows of teeth on the locking arm. It interferes in no way with the operation of my anti-lock picking arrangement in the handcuff.

I have disclosed my invention and I claim:

1. A handcuff of the type shown with a rotatable arm having peripheral teeth, a lock casing having an open top to be closed by said arm, a spring pressed latch having teeth permitting one direction and preventing the other direction of rotation for said arm, the peripheral teeth of said arm being divided into two outside rows with a slot between, a narrow bar carried rigidly on the latch and in line with said slot, said bar being in position when the handcuff is in latch locking position to block off a picking tool between the lock casing end wall and said peripheral teeth.

2. A handcuff comprising in combination two spaced parallel arms, a U shaped spacer member between the arms at one end forming with the arms an open top lock casing, a third arm pivoted between the spaced arms at the end opposite the lock casing, and adapted to turn a complete circle, peripheral ratchet teeth on said third arm extending from its free end over a substantial arc, this arc of said arm adapted to overlie and close the top of said lock casing, an arc shaped groove extending transversely of said teeth, lock mechanism in said casing including a spring pressed latch arm with teeth adapted to engage said ratchet teeth as the latter start to move across the top of the casing, a small rigid bar carried at the meeting end of the latch arm to engage in said arc shaped groove and block off the entrance for a lock picking tool between latch arm and ratchet teeth.

3. A handcuff made up of relatively movable arms and means carried by the arms to lock a wrist between them, said means comprising a lock casing with a side opening adapted to be closed as one arm is moved across such opening, a set of ratchet teeth on said arm, a latch arm with a cooperating set of teeth in the lock casing, said ratchet teeth having a grove through them in the line of their movement, a small rigid bar carried by the latch arm to ride in said groove all for the purpose described.

4. In a handcuff of the type described the combination of oppositely curved clamping arms, one carrying a lock casing and the other carrying a set of peripherally arranged ratchet-like teeth, a latch in the lock casing having a set of cooperating teeth for locking, said latch carrying a small rigid bar on its outside tooth and said ratchet-like teeth having a groove through them in which said bar rides as the arms are clamped together and locked by the latch.

5. A handcuff having clamping members, pivoting means, a lock casing carried opposite to said means across the inner face of which one of the clamping members may swing for closing that face, a latch member with inside teeth within the casing and cooperating teeth on said swinging arm, the latter adapted to slide by the former in one direction and be prevented from backward movement, said swinging arm and latch being provided with a cooperating slot on one and projection to ride in said slot on the other to prevent inserting a lock picking tool between the teeth.

6. A handcuff comprising a lock casing having side plates with extensions therefrom to form spaced parallel semi-circular arms, a spring pressed latch with toothed means lying adjacent one top corner of the lock casing, a semi-circular peripherally toothed arm pivoted opposite the lock casing with a portion to ride across the top of the lock casing for the teeth to engage for locking against one direction of movement, said arm having very small clearance as it starts to overlie the lock casing, a groove on the periphery of its teeth and a projection to ride in said groove on the end of the latch whereby the projection will be in line with said clearance at all times.

7. A handcuff comprising a lock casing having permanently closed bottom, side and end walls, a swinging arm having an end portion shaped to overlie and close the top face of said casing, means extending from the lock casing to a point above it as a support for said arm and to which it is pivoted, the outer end wall at its top surface being positioned for the swinging arm to barely clear it in swinging into covering position for the lock casing, a toothed latch having a projection always movable with the latch and always extending above said top surface in overlapping position with the end of the swinging arm, said arm having an open ended groove extending backwardly from its forward end in which the latch carried projection rides, said arm having teeth on each side of said groove to cooperate with the toothed latch and said side plates being extended upwardly far enough to overlap the sides of the swinging arm with a close clearance fit, all for protecting the lock.

8. In a shackle mechanism of the kind described, a pivoted locking arm having a series of teeth at its free end arranged on an arc with the pivot point as its center, a frame and pivot to carry said arm, a latch arm having toothed means at one end to successively engage the teeth on the pivoted arm as it swings in one direction and to prevent it swinging in the other direction, spring pressed means to hold the latch arm in yielding teeth engaging position, a lock casing on the frame to enclose the latch arm on all sides except its top, said casing providing for a close clearance fit between the upper edge of its outer end wall and the teeth on said arc of the swinging arm, the latter being provided with a groove intermediate of and parallel to its sides and said latch having an upstanding rigid projection beyond its toothed portion to ride in said groove for the purpose described.

FRANCIS G. KELLEY.